(12) United States Patent
Nomoto (10) Patent No.: US 11,150,546 B2
(45) Date of Patent: Oct. 19, 2021

(54) LIGHT SOURCE APPARATUS AND PROJECTOR

(71) Applicant: CANON KABUSHIKI KAISHA, Tokyo (JP)

(72) Inventor: Makoto Nomoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/925,828

(22) Filed: Jul. 10, 2020

(65) Prior Publication Data

US 2021/0018826 A1 Jan. 21, 2021

(30) Foreign Application Priority Data

Jul. 18, 2019 (JP) .............................. JP2019-132435

(51) Int. Cl.
*G03B 21/20* (2006.01)
*G03B 21/16* (2006.01)
*H04N 9/31* (2006.01)

(52) U.S. Cl.
CPC ......... *G03B 21/2033* (2013.01); *G03B 21/16* (2013.01); *G03B 21/2013* (2013.01); *H04N 9/3144* (2013.01)

(58) Field of Classification Search
CPC ............... G03B 21/14; G03B 21/2033; G03B 21/2013; G03B 21/16; H04N 9/31; H04N 9/3144
See application file for complete search history.

(56) References Cited

U.S. PATENT DOCUMENTS

| 7,914,152 | B2* | 3/2011 | Li | G03B 21/2033 |
| | | | | 353/54 |
| 8,226,243 | B2* | 7/2012 | Chen | G03B 21/16 |
| | | | | 353/52 |
| 9,316,894 | B2* | 4/2016 | Dai | G03B 21/16 |
| 9,388,972 | B2 | 7/2016 | Namba | |
| 9,778,552 | B2 | 10/2017 | Yamaguchi | |
| 2010/0053567 | A1* | 3/2010 | Lian | G03B 21/26 |
| | | | | 353/61 |
| 2017/0075201 | A1* | 3/2017 | Terasaki | F21V 29/673 |
| 2021/0063851 | A1* | 3/2021 | Li | G03B 21/16 |

FOREIGN PATENT DOCUMENTS

| JP | 2000338603 A | 12/2000 |
| JP | 2009181098 A | 8/2009 |
| JP | 2013114980 A | 6/2013 |
| JP | 2014139659 A | 7/2014 |
| JP | 2017045002 A | 3/2017 |

* cited by examiner

*Primary Examiner* — William C. Dowling
(74) *Attorney, Agent, or Firm* — Rossi, Kimms & McDowell LLP (57) ABSTRACT

A light source apparatus includes a first light source, a second light source, a first radiator configured to hold the first light source and to radiate heat from the first light source, and a second radiator configured to hold the second light source and to radiate heat from the second light source. The first radiator includes a plurality of first radiating members to be cooled by air introduced from a first direction and superposed in a second direction. The second radiator includes a plurality of second radiating members to be cooled by air introduced from the first direction and superposed in a third direction. Each of the second direction and the third direction is orthogonal to the first direction. The second direction and the third direction are different from each other.

10 Claims, 6 Drawing Sheets

LIGHT SOURCE APPARATUS AND PROJECTOR

BACKGROUND OF THE INVENTION

Field of the Invention

The present invention relates to a light source apparatus and a projector including the light source apparatus.

Description of the Related Art

Japanese Patent Laid-Open No. ("JP") 2013-114980 discloses a light source apparatus that includes a first light source unit having a plurality of first solid-state light sources and a second light source unit having a plurality of second solid-state light sources, wherein emission directions of the first light source unit and the second light source unit are orthogonal to each other in order to achieve the high luminance and compact structure. JP 2014-139659 discloses a light source apparatus that cools a light source unit using a cooling member such as a heat sink.

The emission directions of the two light source units are orthogonal to each other in the light source apparatus disclosed in JP 2013-114980. Thus, in an attempt to dispose the heat sink disclosed in JP 2014-139659 in the light source apparatus disclosed in JP 2013-114980, the heat sinks attached on the sides opposite to the emission directions of the respective light source units are also orthogonal to each other. As a result, in an attempt to efficiently blow cooling air to the heat sinks, the wind direction vectors of the cooling air for the two light source units are also orthogonal to each other, which makes complicated the internal configuration of the light source apparatus and the airflows. In addition, when outside air is directly blown for efficient cooling, the projector housing that houses two light source units needs two or more inlets, and the installation performance is restricted so as to prevent the inlets from being blocked.

SUMMARY OF THE INVENTION

The present invention provides a light source apparatus and a projector, each of which can be efficiently cooled by a unidirectional airflow.

A light source apparatus according to one aspect of the present invention includes a first light source, a second light source, a first radiator configured to hold the first light source and to radiate heat from the first light source, and a second radiator configured to hold the second light source and to radiate heat from the second light source. The first radiator includes a plurality of first radiating members to be cooled by air introduced from a first direction and superposed in a second direction. The second radiator includes a plurality of second radiating members to be cooled by air introduced from the first direction and superposed in a third direction. Each of the second direction and the third direction is orthogonal to the first direction. The second direction and the third direction are different from each other. A projector having the above light source apparatus also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
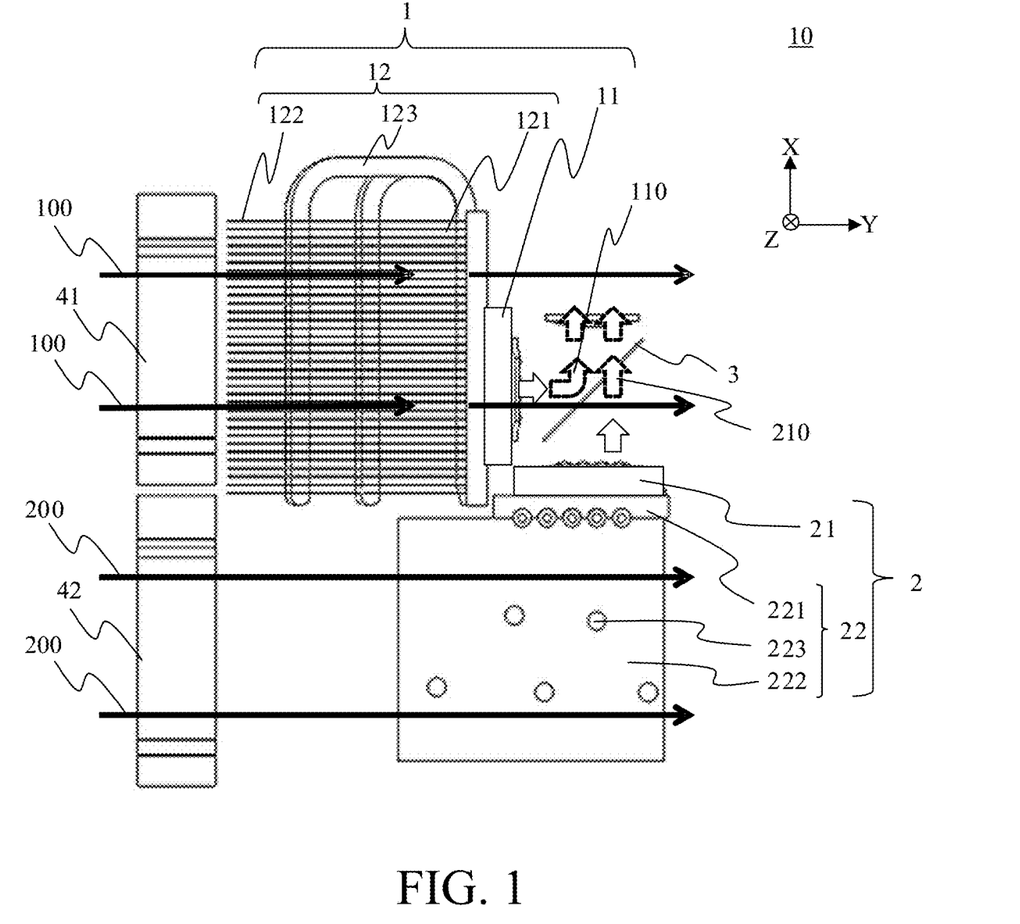
FIG. 1 explains a cooling structure in a light source apparatus according to a first embodiment.
Figure 2:
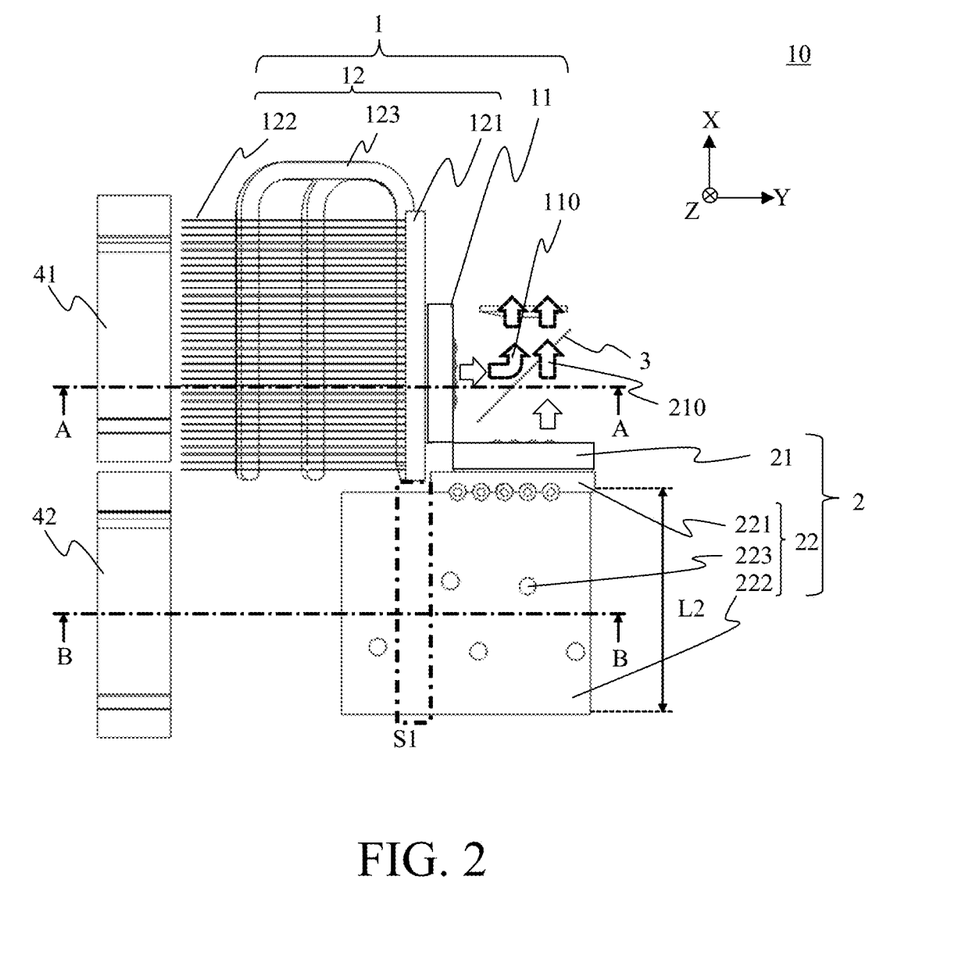
FIG. 2 explains a light beam and a structure of a light source apparatus according to each embodiment.
Figure 3:
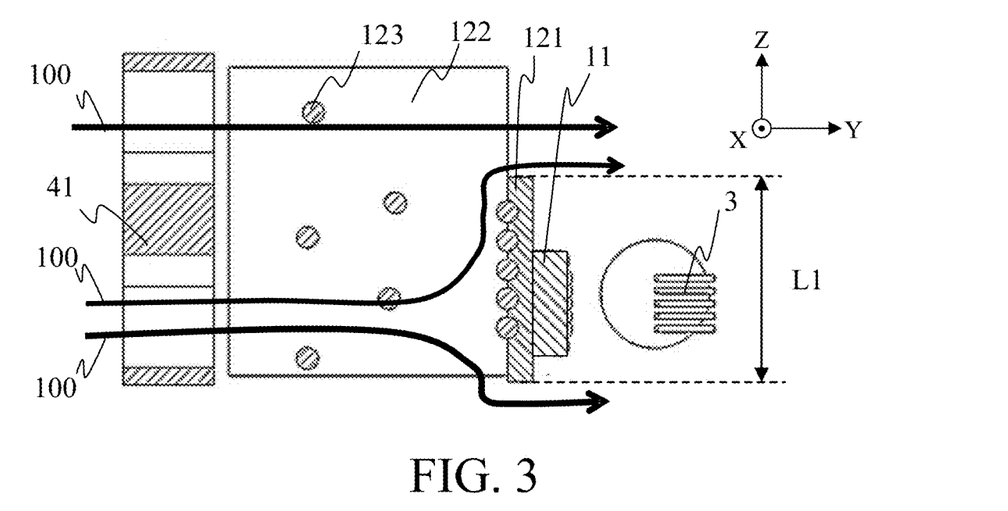
FIG. 3 is a sectional view of the light source apparatus according to each embodiment.
Figure 4:
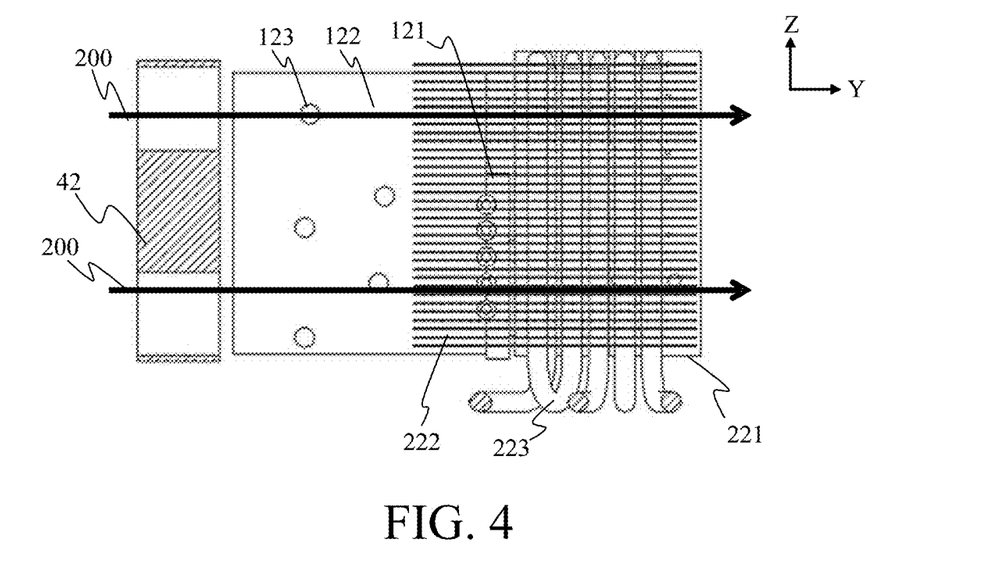
FIG. 4 is a sectional view of the light source apparatus according to each embodiment.

Referring now to FIGS. 1 to 4, a description will be given of a light source apparatus according to a first embodiment of the present invention. FIG. 1 explains of a cooling structure in a light source apparatus 10 according to this embodiment. FIG. 2 explains a light beam and a structure of the light source apparatus 10. FIG. 3 is a sectional view taken along a line A-A in FIG. 2. FIG. 4 is a sectional view taken along a line B-B in FIG. 2.

As illustrated in FIGS. 1 and 2, the light source apparatus 10 includes a first light source unit 1, a second light source unit 2, and a combining unit 3. The first light source unit 1 includes a first light source 11 having a plurality of solid-state light sources that emit laser beams (LD beams), and a first radiator 12 that holds the first light source 11 and radiates heat from the first light source 11. The second light source unit 2 includes a second light source 21 having a plurality of solid-state light sources that emit LD beams, and a second radiator 22 that holds the second light source 21 and radiates heat from the second light source 21. The first light source 11 emits the LD beam in the Y direction. The second light source 21 emits the LD beam in the X direction. Thus, in this embodiment, the emission direction of the first light source 11 and the emission direction of the second light source 21 are orthogonal to each other, but the present invention is not limited to this embodiment.

The combining unit 3 combines the light from the first light source 11 and the light from the second light source 21 with each other. Light transmitting areas and light reflecting areas made of the reflective film are alternated in the combining unit 3. In FIGS. 1 and 2, light 110 from the first light source 11 is reflected by the reflective film in the combining unit 3, and light 210 from the second light source 21 transmits through the light transmitting area. The light from the first light source 11 travels in the same direction (X direction) as that of the light from the second light source 21. The emission direction of the first light source 11 and the emission direction of the second light source 21 are orthogonal to each other. The first emission direction and the second emission direction may be combined at a specific angle.

The first radiator 12 conducts or radiates the heat generated using a plurality of solid-state light sources as heat sources. The first radiator 12 is held in contact with the light source 11 via grease (not shown). The second radiator 22 is held in contact with the light source 21 via grease (not shown). In this embodiment, the first radiator 12 is disposed relative to the first light source 11, and the second radiator 22 is disposed relative to the second light source 21. The first radiator 12 includes a base portion (first holder) 121 that contacts the light source 11 through grease, and a plurality of fin portions (a plurality of radiating members) 122 coupled to the base portion 121 and configured to maintain the shape and to radiate the heat. Similarly, the second radiator 22 includes a base portion (second holder) 221 that contacts the light source 21 via grease, and a plurality of fin portions (a plurality of radiating members) 222 coupled to the base portion 20021 and configured to maintain the shape and to radiate the heat. The first radiator 12 and the second radiator 22 have an effect of efficiently radiating the heat from the light sources 11 and 21 at the base portions 121 and 221 and an effect of efficiently conducting the heat to the fin portions 122 and 222, and includes a plurality of heat pipes 123 and 223 for increasing the cooling capacity.

Thus, according to this embodiment, the first radiator 12 includes a plurality of fin portions 122 superposed in the second direction (first superposing direction: X direction) so as to be cooled by air introduced from the first direction (Y direction). The second radiator 22 has a plurality of fin portions 222 superposed in the third direction (second superposing direction: Z direction) so as to be cooled by air introduced from the first direction. Each of the second direction and the third direction is orthogonal to the first direction. In this embodiment, the second direction and the third direction are orthogonal to each other, but the present invention is not limited to this embodiment, and the second direction and the third direction may be different from each other.

In this embodiment, the first light source unit 1 is an integrated unit including the first light source 11 and the first radiator 12. The second light source unit 2 is an integrated unit including the second light source 21 and the second radiator 22. In this embodiment, the first light source 11 and the second light source 21 may be semiconductor light sources of indium gallium nitride (B light). Alternatively, the first light source 11 may be a semiconductor light source of aluminum gallium arsenide (R light), and the second light source 21 may be a semiconductor light source of indium gallium nitride (B light).

Solid arrows 100 and 200 illustrated in FIG. 1 indicate flows of air (cooling air) to the first light source unit 1 and the second light source unit 2. The fan 41 blows cooling air on the first radiator 12 and the fan 42 blows cooling air on the second radiator 22, thereby cooling the first light source 11 and the second light source 21.

Referring now to FIGS. 1, 3, and 4, a description will be given of a cooling configuration. In the first radiator 12, the plurality of fin portions 122 are superposed or stacked in the X direction. In the second radiator 22, the plurality of fin portions 222 are superposed or stacked in the Z direction. In this embodiment, the first radiator 12 and the second radiator 22 have the same shape, and the cost can be reduced by using common components.

The solid arrow 100 in FIG. 3 indicates the flow of the cooling air for the first light source unit 1. The solid arrow 200 in FIG. 4 indicates the flow of the cooling wind for the second light source unit 2. The fan 41 that cools the first radiator 12 is disposed in the − (minus) Y direction relative to the first radiator 12 and blows the cooling air in the Y direction. The fan 42 that cools the second radiator 22 is also disposed in the −Y direction relative to the second radiator 22 and blows cooling air in the Y direction. As illustrated in FIG. 3, in the first radiator 12, cooling airflows in the Y direction, passes among the plurality of fins 122, collides with the base portion 121, and flows in the Z and −Z directions and then in Y direction. As illustrated in FIG. 4, in the second radiator 22, the cooling air flows in the Y direction, passes among the plurality of fin portions 222, and flows in the Y direction as it is. The stacking or superposing direction of the plurality of fin portions 122 in the first radiator 12 and the stacking or superposing direction of the plurality of fins 222 in the second radiator 22 may tilt as long as they do not remarkably obstruct the cooling airflows.

Figure 5:
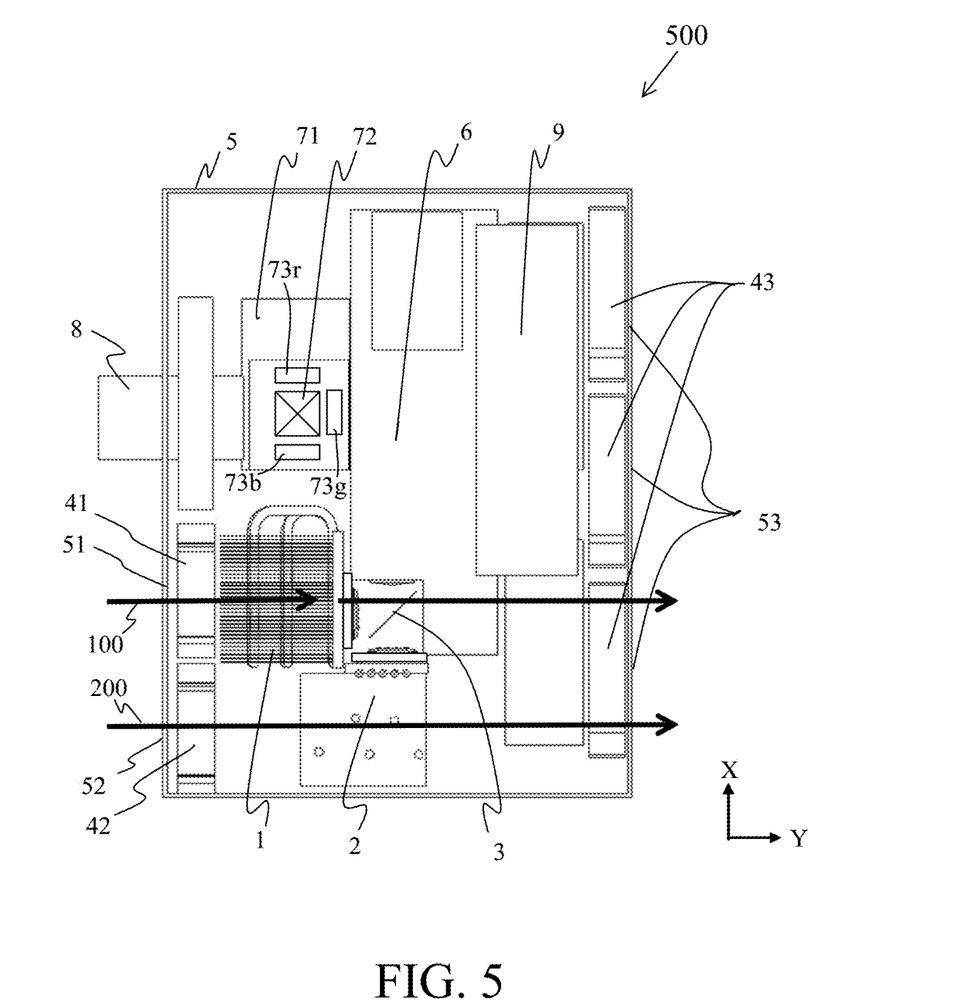
FIG. 5 illustrates a structure of a projector according to each embodiment.
Figure 6A:
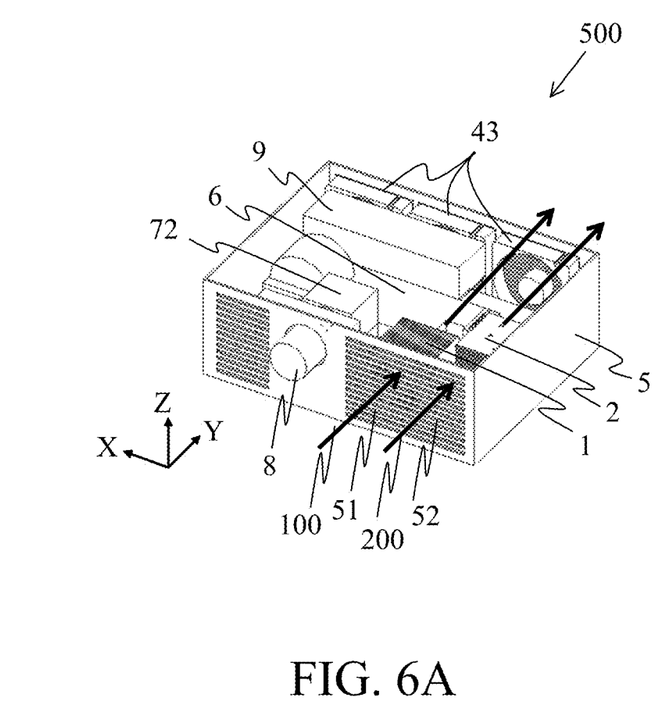
FIGS. 6A and 6B are perspective views of the projector according to each embodiment.
Figure 6B:
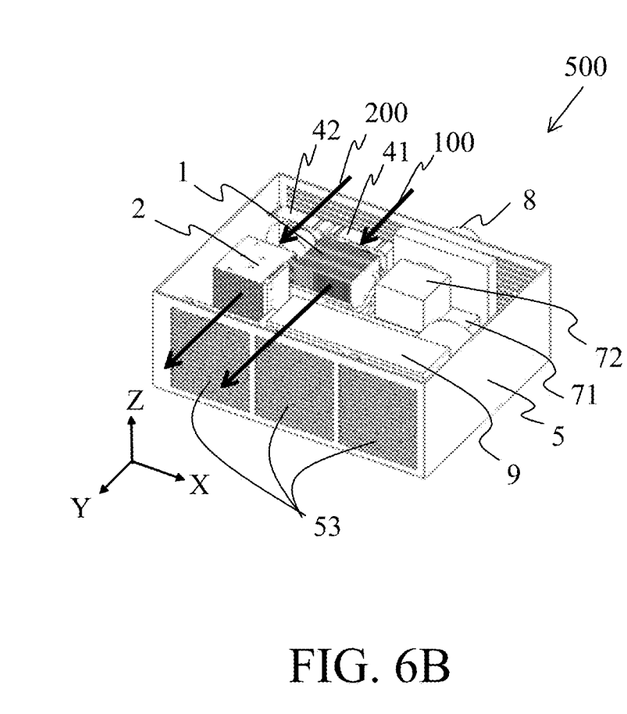

Referring now to FIGS. 5, 6A, and 6B, a description will be given of a projector (image projection apparatus) 500 including the light source apparatus 10 according to this embodiment. FIG. 5 illustrates a structure of the projector 500. FIGS. 6A and 6B are perspective views of the projector 500, and FIGS. 6A and 6B are figures viewed from different directions. Solid arrows in FIGS. 5, 6A, and 6B represent cooling airflows passing through the first light source unit 1 and the second light source unit 2.

The housing 5 that forms the appearance of the projector 500 includes an upper housing member and a lower housing member (not shown). The housing 5 that houses the first light source unit 1 and the second light source unit 2 (or the light source apparatus 100) has a first inlet 51 and a second inlet 52 for taking in the cooling air to the first radiator 12 and the second radiator 22 in the housing 5. The first inlet 51 takes in air for cooling the plurality of fin portions 122. The second inlet 52 takes in air for cooling the plurality of fin portions 222. Thus, the first inlet 51 and the second inlet 52 correspond to the first radiator 12 and the second radiator 22, respectively. The first inlet 51 and the second inlet 52 are formed on the same surface of the housing 5. In this embodiment, the first inlet 51 and the second inlet 52 are the same inlet, but the present invention is not limited to this embodiment. An exhaust fan 43 is disposed in the housing 5. An outlet 53 is provided in a surface different from the surface on which the first inlet 51 and the second inlet 52 of the housing 5 are provided, for example, on the opposite surface, and used to exhaust the internal heat.

Disposed inside the housing 5 of the projector 500 are a light source unit 6 (corresponding to the light source apparatus 10) including the first light source unit 1 and the second light source unit 2, an illumination optical system 71, a color separation and combination optical system 72, and the projection lens 8. The light source unit 6 has a phosphor (fluorescent object) that converts the wavelength of light from each of the first light source 11 and the second light source 21 into a wavelength band different from that of incident light, and emits the light. The inside of the light source unit 6 has a dust-proof sealed structure. The phosphor is applied in an annular shape using a metal wheel, and the wheel is attached to a motor and rotated.

The light from the light source unit 6 illustrates the color separation and combination optical system 72 via the illumination optical system 71. The illumination optical system 71 has a glass member such as a cylinder array, and a plurality of light beams form a rectangular uniform illumination area while rectangular images are superimposed. The illumination optical system 71 has an optical sensor and detects a red (R) light amount, a green (G) light amount, and a blue (B) light amount for minute leaked light or transmission light in the illumination optical system 71. The color separation and combination optical system 72 separates the P-polarized light and S-polarized light divided by the illumination optical system 71 into the R, G, and B colored light. Image forming elements 73r, 73g, and 73b provided for the respective R, G, and B colors reflect light and perform image modulations to form images. Again, the light combined by the optical element that combines the R, G, and B light beams is irradiated onto the projection lens (optical element) 8. The projection lens 8 magnifies the irradiated light (image) and changes the focus, so that the image is projected on the screen as a projection surface. In the housing 5, an electric board 9 is disposed for driving the projector, such as supplying power to the light source unit 6 and processing signals to the image forming elements 73*r*, 73*g*, 73*b*. In this way, the projector 500 has the image forming elements 73*r*, 73*g*, and 73*b* that form images based on the light emitted from the light source apparatus 10 and the projection lens 8 that magnifies and projects the images formed by the image forming elements 73*r*, 73*g*, and 73*b*.

Referring now to FIGS. 1 to 6B, a description will be given of the effects of this embodiment. In the prior art configuration, since the radiator is disposed on the surface opposite to the emission direction with respect to the light source, the fan for cooling the light source is often disposed on the extension of the light source and the radiator. Such a configuration creates complicated airflows by making the blowing wind directions to the first light source unit and the second light source unit including the first light source and the second light source substantially orthogonal to each other. In addition, the blowing channel and the structure for not obstructing the blowing airflows become complicated and large.

When the radiator of the first light source unit and the radiator of the second light source unit are disposed near the inlets in the housing in order to improve the cooling efficiency, it is necessary to separately provide the housing with the inlet for the first light source unit and the inlet for the second light source. Hence, it is necessary to use two surfaces out of the six surfaces constituting the housing for the inlets. Since the inlet takes in the cooling air for the projector, it is necessary to avoid an obstacle or high-temperature intake outside the inlet to some extent. Thus, there are restrictions in the installation environment for the user.

When the fin portions in the first radiator and the fin portions in the second radiator are both stacked in the Z-axis direction, the inlets in the housing can be arranged on a single surface. However, the cooling effect may be prevented, such as the wind that has passed through the first radiator obstructing the intake for the second radiator, the wind after the heat exchange being taken in, or the second radiator obstructs the exhaust channel.

The configuration according to this embodiment can set the direction of the cooling air to the first radiator 12 and the direction of the cooling air to the second radiator 22 to the same direction (Y direction), and set the winds that have passed through the first radiator 12 and the second radiator 22 to the same direction (Y direction). Thus, an efficient airflow is made in the housing 5. Since the first inlet 51 and the second inlet 52 can also be disposed on the one surface of the housing 5, it is possible to relieve the restrictions on the installation environment for the user. Since the inlets 51 and 52 can be provided to the same surface, a single fan can be substituted for the fans 41 and 42, and the size and cost can be reduced.

Next follows a description of the cooling efficiency according to this embodiment. In the first radiator 12, the cooling air impinges on the base portion 121 (from the Y direction to the Z and −Z directions), so that the boundary layer between the object and the fluid can be made thinner and the cooling efficiency becomes high.

By increasing a length L2 of the fin portion 222 in the second radiator 21 in FIG. 2 in the X direction, it is possible to increase an area of the channel section (XZ plane) from the inlet 52. As a result, the system resistance of the fluid can be lowered, the contact surface area between the fin portion 222 and the cooling air can be made larger, and thus the cooling ability can be improved.

As illustrated in FIG. 3, assume that L1 is a length of the base portion 121 in the first radiator 12 in a direction (such as the Z direction) orthogonal to each of a first direction (such as the Y direction) and a second direction (such as the X direction). As illustrated in FIG. 2, assume that L2 is a length of the fin portion 222 in the second radiator 22 in a direction (such as the X direction) orthogonal to each of the first direction (such as the Y direction) and the third direction (such as the Z direction). Then, the length L2 is longer than the length L1 (L2>L1). Thereby, the height direction (Z direction) of the housing 5 can be suppressed, so that the housing 5 can be made smaller in the height direction while the cooling ability is maintained.

The first radiator 12 is configured such that the length of the fin portion 122 in the Z direction is longer than the length L1 of the base portion 121 in the Z direction. Thereby, the wind after passing through the first radiator 12 can be easily guided in the Y direction, and the fluid system resistance by the base portion 121 can be reduced. Thus, it is possible to increase the flow velocity passing through the fin portion 122 and to improve the cooling ability.

As illustrated in FIG. 2, part of the fin portion 222 in the second radiator is disposed on the projection plane (S1 area) of the base portion 121 in the first radiator 12 in the −X direction. Thereby, a space generated between the first radiator 12 and the second radiator 22 can be used as a cooling unit, and the cooling ability can be enhanced.

As illustrated in FIGS. 5, 6A, and 6B, air is taken in through the first inlet 51 and the second inlet 52 disposed in the housing surface in the direction (−Y direction) in which light is emitted from the projection lens 8, and the air is exhausted through the outlet 53 disposed in the housing surface in the direction (Y direction) opposite to the light emission direction of the projection lens 8. Thereby, the linear airflow in the housing 5 allows the efficient intake and exhaust.

A multi-projection method, a stack projection method, and the like are known in which multiple images are combined to make them larger by disposing multiple housings, or by superimposing them to make them brighter. In the above projection method, the first inlet 51, the second inlet 52, and the outlet 53 are linearly arranged on the surface in the Y direction, so that the intakes and exhausts of the housings are less influential although a plurality of housings are arranged close to each other. This configuration can relieve the installation restrictions for the user and restrain the thermal runaway of the housing.

Second Embodiment

Figure 7:
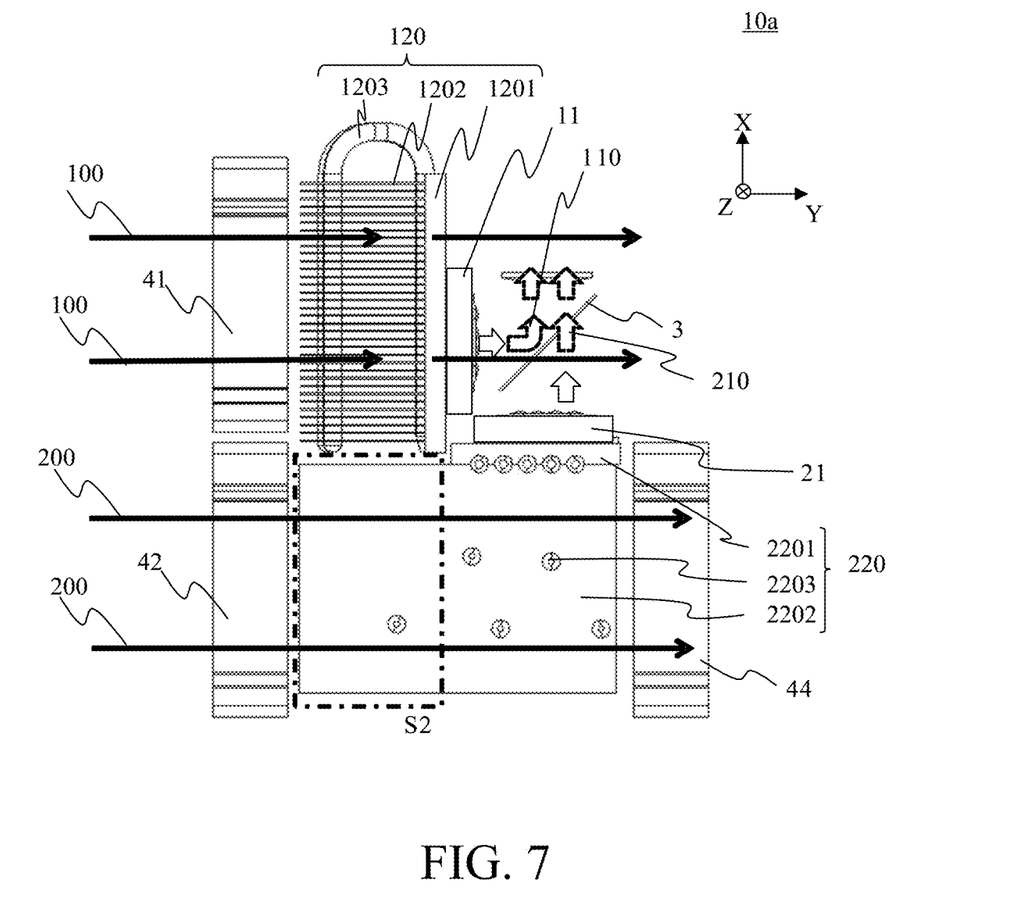
FIG. 7 explains of a cooling structure in the light source apparatus according to the second embodiment.

Referring now to FIG. 7, a description will be given of a light source apparatus according to a second embodiment of the present invention. FIG. 7 explains a cooling structure of a light source apparatus 10*a* according to this embodiment. The light source apparatus 10*a* according to this embodiment is different from the light source apparatus 10 according to the first embodiment in having a first radiator 120 and a second radiator 220 in place of the first radiator 12 and the second radiator 22. The other configuration, system, and cooling airflow of the light source apparatus 10*a* are the same as those of the light source apparatus 10 according to the first embodiment, and thus a description thereof will be omitted.

As illustrated in FIG. 7, the first radiator 120 includes a base portion 1201, fin portions 1202, and a heat pipe 1203. The second radiator 220 has a base portion 2201, fin portions 2202, and a heat pipe 2203. In addition, the solid arrow in FIG. 7 represents the cooling wind flows of the first radiator 120 and the second radiator 220.

The first radiator 120 maintains a large area for a channel section (XZ plane) of the first fan 41 and a small area for the channel (Y direction) of the fin portion 1202 to improve the cooling performance. The second radiator 220 is configured such that the fin portion 2202 of the second radiator 220 is disposed at the portion of the complex angle (area S2) generated between the first radiator 120 and the second radiator 220. As described above, in this embodiment, part of the fin portion 2202 in the second radiator 220 is disposed on the projection surface of the fin portion 1202 in the first radiator 120 in the X direction (second direction). This configuration increases the contact surface area with the cooling air, and enhances the cooling ability. Due to the above effect, the cooling ability is improved, and the size can be reduced by the efficient arrangement.

In addition, the second radiator 220 is disposed close to the direction (−Y direction) of the fan 42. Thereby, the fan 44 can be disposed closer to the Y direction than the second radiator 220. By disposing the radiator 220 between the fans 42 and 44, the static pressure of the wind passing through the fin portion 2202 in the second radiator 220 can made larger, so that the flow velocity can be made higher and the cooling ability can be improved.

Each embodiment can provide a light source apparatus and a projector, each of which can be efficiently cooled by a unidirectional airflow.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-132435, filed on Jul. 18, 2019, which is hereby incorporated by reference herein in its entirety.

What is claimed is:

1. A light source apparatus comprising:
a first light source;
a second light source;
a first radiator configured to hold the first light source and to radiate heat from the first light source; and
a second radiator configured to hold the second light source and to radiate heat from the second light source,
wherein the first radiator includes a plurality of first radiating members to be cooled by air introduced from a first direction and superposed in a second direction,
wherein the second radiator includes a plurality of second radiating members to be cooled by air introduced from the first direction and superposed in a third direction,
wherein each of the second direction and the third direction is orthogonal to the first direction, and
wherein the second direction and the third direction are different from each other.

2. The light source apparatus according to claim 1, wherein the second direction and the third direction are orthogonal to each other.

3. The light source apparatus according to claim 1, wherein an emission direction of the first light source and an emission direction of the second light source are orthogonal to each other.

4. The light source apparatus according to claim 1, wherein the first radiator includes a first holder configured to holds the plurality of first radiating members, and
wherein the second radiator includes a second holder configured to hold the plurality of second heat radiation members,
wherein a length of the second radiating member in a direction orthogonal to each of the first direction and the third direction is longer than a length of the first holder in a direction orthogonal to each of the first direction and the second direction.

5. The light source apparatus according to claim 1, wherein part of the second radiating member is disposed on a projection surface of the first radiating member in the second direction.

6. The light source apparatus according to claim 1, wherein each of the first light source and the second light source includes a solid-state light source.

7. The light source apparatus according to claim 1, wherein the first radiator and the second radiator have the same shape.

8. A projector comprising:
a light source apparatus;
an image forming element configured to form an image based on light emitted from the light source apparatus; and
an optical element configured to magnify and project the image formed by the image forming element,
wherein the light source apparatus includes:
a first light source;
a second light source;
a first radiator configured to hold the first light source and to radiate heat from the first light source; and
a second radiator configured to hold the second light source and to radiate heat from the second light source,
wherein the first radiator includes a plurality of first radiating members to be cooled by air introduced from a first direction and superposed in a second direction,
wherein the second radiator includes a plurality of second radiating members to be cooled by air introduced from the first direction and superposed in a third direction,
wherein each of the second direction and the third direction is orthogonal to the first direction, and
wherein the second direction and the third direction are different from each other.

9. The projector according to claim 8, further comprising a housing configured to house the light source apparatus,
wherein the housing has, on the same surface, a first inlet that takes in air that cools the plurality of first radiating members and a second inlet that takes in air that cools the plurality of second radiating members.

10. The projector according to claim 9, wherein the first inlet is the second inlet.

* * * * *